United States Patent
Calo et al.

(10) Patent No.: US 11,005,920 B2
(45) Date of Patent: *May 11, 2021

(54) SYNCHRONIZED RELEASE OF RESOURCES USED IN DEFERENTIAL CLOUD SERVICES

(71) Applicant: INTERNATIONAL BUSINESS MACHINES CORPORATION, Armonk, NY (US)

(72) Inventors: Seraphin B. Calo, Cortlandt Manor, NY (US); Douglas M. Freimuth, New York, NY (US); Franck V. Le, West Palm Beach, FL (US); Maroun Touma, Redding, CT (US); Dinesh C. Verma, New Castle, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/562,022

(22) Filed: Sep. 5, 2019

(65) Prior Publication Data

US 2019/0394262 A1    Dec. 26, 2019

Related U.S. Application Data

(63) Continuation of application No. 15/806,978, filed on Nov. 8, 2017, which is a continuation of application
(Continued)

(51) Int. Cl.
*H04L 29/08*      (2006.01)
*G06F 9/46*       (2006.01)
(Continued)

(52) U.S. Cl.
CPC .......... *H04L 67/1002* (2013.01); *G06F 9/466* (2013.01); *G06F 9/5083* (2013.01);
(Continued)

(58) Field of Classification Search
CPC .............. G06F 11/1471; G06F 11/203; G06F 11/2094; G06F 17/30283; H04L 41/0668; H04L 41/069
See application file for complete search history.

(56) References Cited

U.S. PATENT DOCUMENTS 7,805,407 B1 * 9/2010 Verbeke .................. G06F 16/27
                                                          707/634
7,870,044 B2    1/2011 Robertson
(Continued)

FOREIGN PATENT DOCUMENTS

CN              102255934         11/2011

OTHER PUBLICATIONS

List of IBM Patents or Patent Applications Treated as Related dated Sep. 5, 2019, 2 pages.
(Continued)

*Primary Examiner* — Shean Tokuta
(74) *Attorney, Agent, or Firm* — Tutunjian & Bitetto, P.C.; Vazken Alexanian

(57) ABSTRACT

A method is provided of using a set of servers to provide deferential services that have a pre-negotiated time for notice to release the servers. The method includes defining a virtual checkpoint frame interval that is constrained to a duration of up to half of the pre-negotiated time for notice to release the servers. The method includes, responsive to an end of the interval, (i) writing, to a shared state database, a state of processing of the packets and transactions occurring during the interval that are processed by a current one of the servers, and (ii) releasing the packets and transactions occurring during the interval. The method includes copying the packets and transactions occurring during the interval, and the state, from the current server to another server for
(Continued)

subsequent processing, responsive to an indication of an instance loss on the current server.

8 Claims, 8 Drawing Sheets

Related U.S. Application Data

No. 15/439,146, filed on Feb. 22, 2017, now Pat. No. 10,341,428.

(51) Int. Cl.
*G06F 9/50* (2006.01)
*H04L 12/927* (2013.01)
*H04L 12/911* (2013.01)

(52) U.S. Cl.
CPC .......... *H04L 47/741* (2013.01); *H04L 47/748* (2013.01); *H04L 47/781* (2013.01); *H04L 47/803* (2013.01); *H04L 47/826* (2013.01)

(56) References Cited

U.S. PATENT DOCUMENTS

| | | | | |
|---|---|---|---|---|
| 8,260,840 B1* | 9/2012 | Sirota | .................... | G06F 9/5061 370/216 |
| 8,296,759 B1* | 10/2012 | Hutchins | ............. | G06F 9/45558 709/223 |
| 8,321,558 B1* | 11/2012 | Sirota | .................... | G06F 9/5011 709/224 |
| 8,615,566 B1* | 12/2013 | Tu | ........................ | G06F 11/2025 709/219 |
| 8,719,415 B1* | 5/2014 | Sirota | .................... | G06F 9/5061 709/221 |
| 8,880,638 B2 | 11/2014 | Jeswani et al. | | |
| 9,208,032 B1* | 12/2015 | McAlister | ........... | G06F 11/1471 |
| 9,632,815 B2 | 4/2017 | DeCusatis et al. | | |
| 9,652,568 B1* | 5/2017 | Tzelnic | ................. | G06F 15/177 |
| 9,948,514 B2* | 4/2018 | Kansal | ................ | H04L 43/0888 |
| 9,985,848 B1* | 5/2018 | Ward, Jr. | ............ | H04L 41/5051 |
| 10,191,778 B1 | 1/2019 | Yang et al. | | |
| 10,693,759 B2 | 6/2020 | Baughman et al. | | |
| 2015/0089067 A1 | 3/2015 | Islam et al. | | |
| 2015/0145949 A1* | 5/2015 | Olivier | ................ | H04L 65/1046 348/14.12 |
| 2017/0063936 A1 | 3/2017 | Waas et al. | | |
| 2018/0077226 A1 | 3/2018 | Guim Bernat et al. | | |

OTHER PUBLICATIONS

List of IBM Patents or Patent Applications Treated as Related dated Nov. 8, 2017, 2 pages.

* cited by examiner

SYNCHRONIZED RELEASE OF RESOURCES USED IN DEFERENTIAL CLOUD SERVICES

BACKGROUND

Technical Field

The present invention relates generally to cloud services and, in particular, to synchronized release of resources used in deferential cloud services.

Description of the Related Art

In a bare-metal cloud environment, a set of servers are provided for rental to the customers as needed. In order to deal with customer demands, the provider of such a cloud environment always needs to maintain a surplus number of servers. Invariably, at any time, there are servers which are excess, i.e., not being used by a paying customer. These cloud providers would like to make money off the excess servers by running services on them.

The current procedure followed by cloud operators offer time-based solutions that make resources available to the consumer within a predefined and agreed to time-window at the end of which the cloud operator can reclaim the resources. This approach puts the burden on the service operator to design its service and allocate its resources such that the service execution can complete prior to releasing the resource used by the "dying" service. This approach adds complexity to the service design. It also requires pre-planning and a human in the loop in order to mitigate against potential losses and degradation in performance by the service provider when the cloud operator reclaims the assigned resources. Further, it only applies to request driven services where the service provider does not need to carry the context from interrupted operation and can guaranty completion of the operation in the allocated time window. For continual services, the current prior art assumes changes in workload and incorporates elasticity to scale up and down based on workload increases or decreases over time and uses a predefined workload threshold to trigger increases or decreases in resource allocation. In contrast, deferential services require that the service provider must be able to shrink its footprint of assigned resources independent of the workload.

Thus, there is a need for synchronized release of resources used in deferential cloud services.

SUMMARY

According to an aspect of the present invention, a computer-implemented method is provided of using a set of servers to provide deferential services that have a pre-negotiated time for notice to release the servers. The method includes defining, by a deferential cloud service broker, a virtual checkpoint frame interval that is constrained to a duration of up to half of the pre-negotiated time for notice to release the servers. The method also includes, responsive to an end of the virtual checkpoint frame interval, (i) writing, by a flow controller to a shared state database, a state of processing of packets and transactions occurring during the virtual checkpoint frame interval that are processed by a current one of the servers, and (ii) releasing, by the flow controller, the packets and transactions occurring during the virtual checkpoint frame interval. The method additionally includes copying, by the flow controller, the packets and transactions occurring during the virtual checkpoint frame interval, and the state, from the current one of the servers to another one of the servers for subsequent processing, responsive to an indication of an instance loss on the current one of the servers.

According to another aspect of the present invention, a computer program product is provided for using a set of servers to provide deferential services that have a pre-negotiated time for notice to release the servers. The computer program product includes a non-transitory computer readable storage medium having program instructions embodied therewith. The program instructions are executable by a computer to cause the computer to perform a method. The method includes defining, by a deferential cloud service broker, a virtual checkpoint frame interval that is constrained to a duration of up to half of the pre-negotiated time for notice to release the servers. The method also includes, responsive to an end of the virtual checkpoint frame interval, (i) writing, by a flow controller to a shared state database, a state of processing of packets and transactions occurring during the virtual checkpoint frame interval that are processed by a current one of the servers, and (ii) releasing, by the flow controller, the packets and transactions occurring during the virtual checkpoint frame interval. The method additionally includes copying, by the flow controller, the packets and transactions occurring during the virtual checkpoint frame interval, and the state, from the current one of the servers to another one of the servers for subsequent processing, responsive to an indication of an instance loss on the current one of the servers.

According to yet another aspect of the present invention, a system is provided for using a set of servers to provide deferential services that have a pre-negotiated time for notice to release the servers. The system includes a deferential cloud service broker for defining a virtual checkpoint frame interval that is constrained to a duration of up to half of the pre-negotiated time for notice to release the servers. The system further includes a flow controller for, responsive to an end of the virtual checkpoint frame interval, (i) writing, to a shared state database, a state of processing of packets and transactions occurring during the virtual checkpoint frame interval that are processed by a current one of the servers, and (ii) releasing the packets and transactions occurring during the virtual checkpoint frame interval. The flow controller copies the packets and transactions occurring during the virtual checkpoint frame interval, and the state, from the current one of the servers to another one of the servers for subsequent processing, responsive to an indication of an instance loss on the current one of the servers.

These and other features and advantages will become apparent from the following detailed description of illustrative embodiments thereof, which is to be read in connection with the accompanying drawings.

BRIEF DESCRIPTION OF THE DRAWINGS

The following description will provide details of preferred embodiments with reference to the following figures wherein.

DETAILED DESCRIPTION

The present invention is directed to synchronized release of resources used in deferential cloud services.

In an embodiment, the present invention provides a set of offerings by which the excess servers in a cloud environment can be monetized. In order to be monetized, new software services are offered using the excess services. However, since the services can lose the underlying infrastructure very quickly, they have to be designed specially in order to be offered. We refer to this class of services as deferential service, that is, services which defer their infrastructure to other services/workload as needed.

Deferential Services can be of one of two types, namely request-driven or continual. Request driven deferential services (or "request driven services" in short) are ones which perform some set of actions when a request is received from a user, e.g., a Domain Name Service receives a name request and returns a response back. Continual deferential services (or "continual services" in short) are those which result in tasks that are long running, e.g., one may take a set of video images and transcode them into different formats, or a task which runs an analysis job on a large set of network call data records, and so forth.

Capacity utilization in a cloud data centers goes through ebbs and flows. When available capacity exceeds short-term demand, the excess capacity is put to use by the deferential services. When capacity becomes scares, the cloud operator must reclaim the resources. This presents a particular challenge for continual services as they need to constantly persist their state in case they need to release their assigned resources. This challenge is addressed by the present invention.

Figure 1:
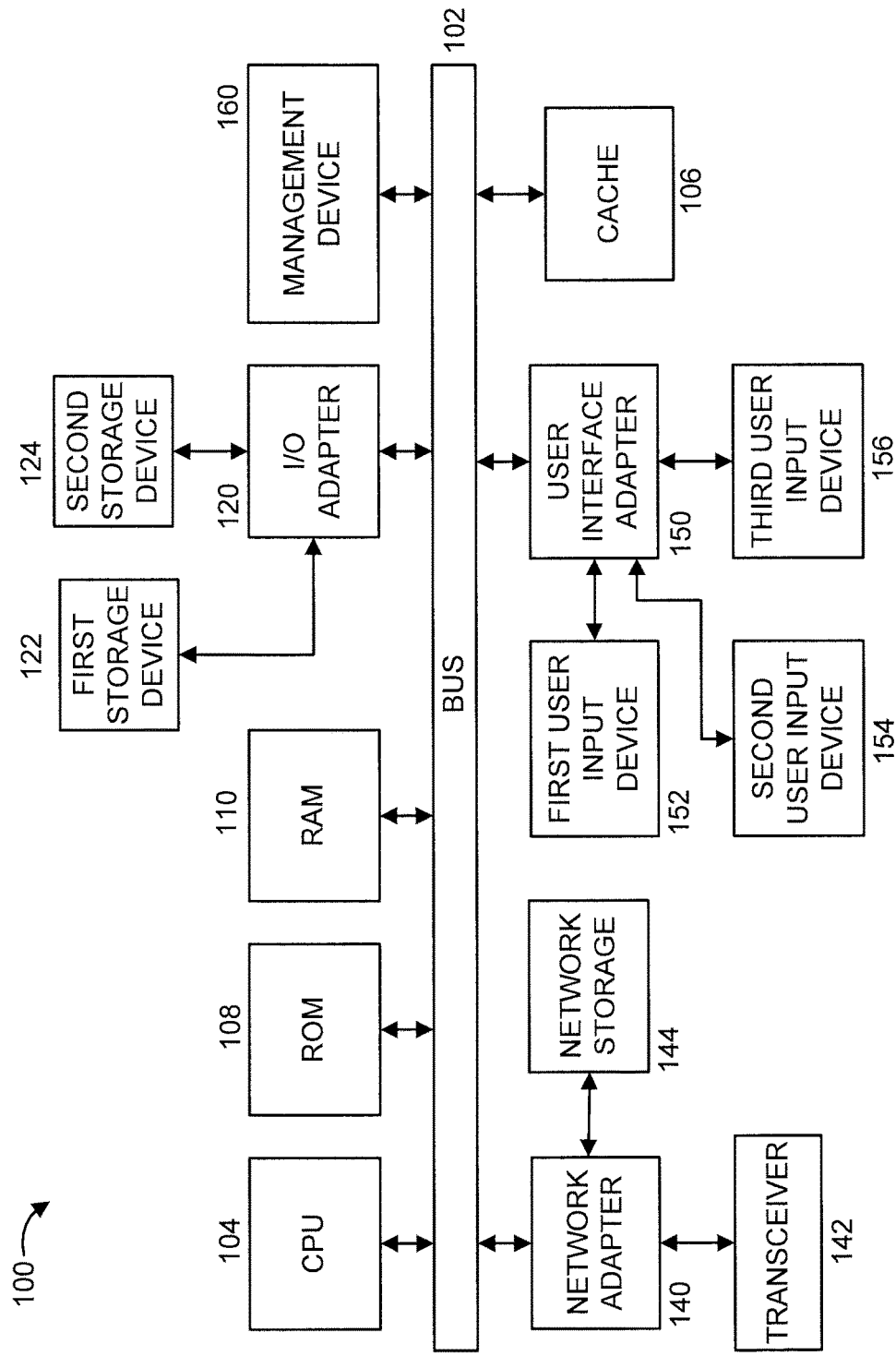
FIG. 1 shows an exemplary processing system to which the present invention may be applied, in accordance with an embodiment of the present invention.

FIG. 1 shows an exemplary processing system 100 to which the invention principles may be applied, in accordance with an embodiment of the present invention. The processing system 100 includes at least one processor (CPU) 104 operatively coupled to other components via a system bus 102. A cache 106, a Read Only Memory (ROM) 108, a Random Access Memory (RAM) 110, an input/output (I/O) adapter 120, a network adapter 140, a user interface adapter 150, and a management interface 160, are operatively coupled to the system bus 102.

A first storage device 122 and a second storage device 124 are operatively coupled to system bus 102 by the I/O adapter 120. The storage devices 122 and 124 can be any of a disk storage device (e.g., a magnetic or optical disk storage device), a solid state magnetic device, and so forth. The storage devices 122 and 124 can be the same type of storage device or different types of storage devices.

A transceiver 142 is operatively coupled to system bus 102 by network adapter 140. A network storage device (hereinafter "network storage" in short) 144 is accessible via the network adapter 140.

A first user input device 152, a second user input device 154, and a third user input device 156 are operatively coupled to system bus 102 by user interface adapter 150. The user input devices 152, 154, and 156 can be any of a keyboard, a mouse, a keypad, an image capture device, a motion sensing device, a microphone, a device incorporating the functionality of at least two of the preceding devices, and so forth. Of course, other types of input devices can also be used, while maintaining the spirit of the present invention. The user input devices 152, 154, and 156 can be the same type of user input device or different types of user input devices. The user input devices 152, 154, and 156 are used to input and output information to and from system 100.

Of course, the processing system 100 may also include other elements (not shown), as readily contemplated by one of skill in the art, as well as omit certain elements. For example, various other input devices and/or output devices can be included in processing system 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized as readily appreciated by one of ordinary skill in the art. These and other variations of the processing system 100 are readily contemplated by one of ordinary skill in the art given the teachings of the present invention provided herein.

Figure 2:
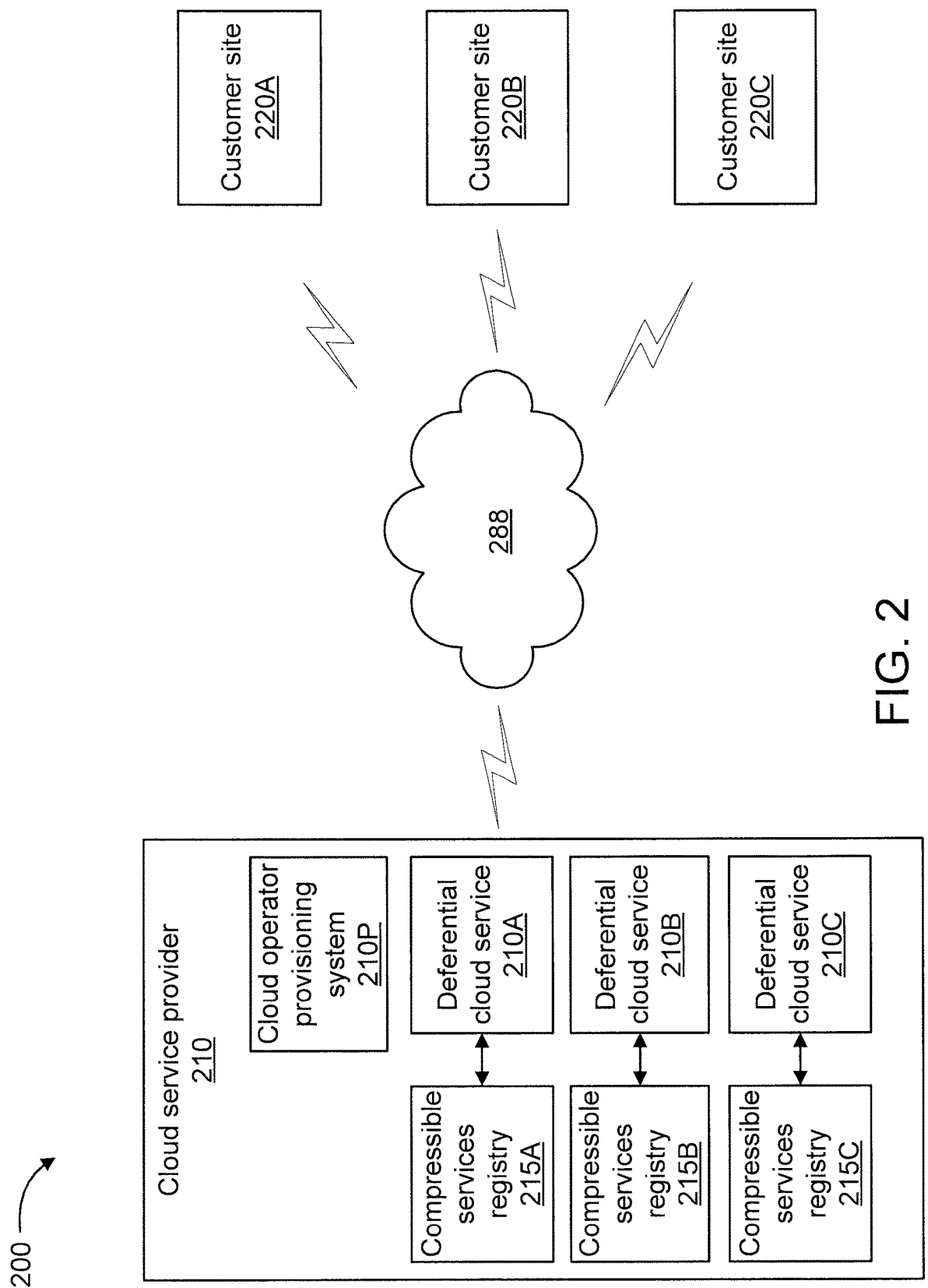
FIG. 2 shows an exemplary environment to which the present invention can be applied, in accordance with an embodiment of the present invention.

Moreover, it is to be appreciated that environment 200 described below with respect to FIG. 2 is an environment for implementing respective embodiments of the present invention. Part or all of processing system 100 may be implemented in one or more of the elements of environment 200.

Figure 3:
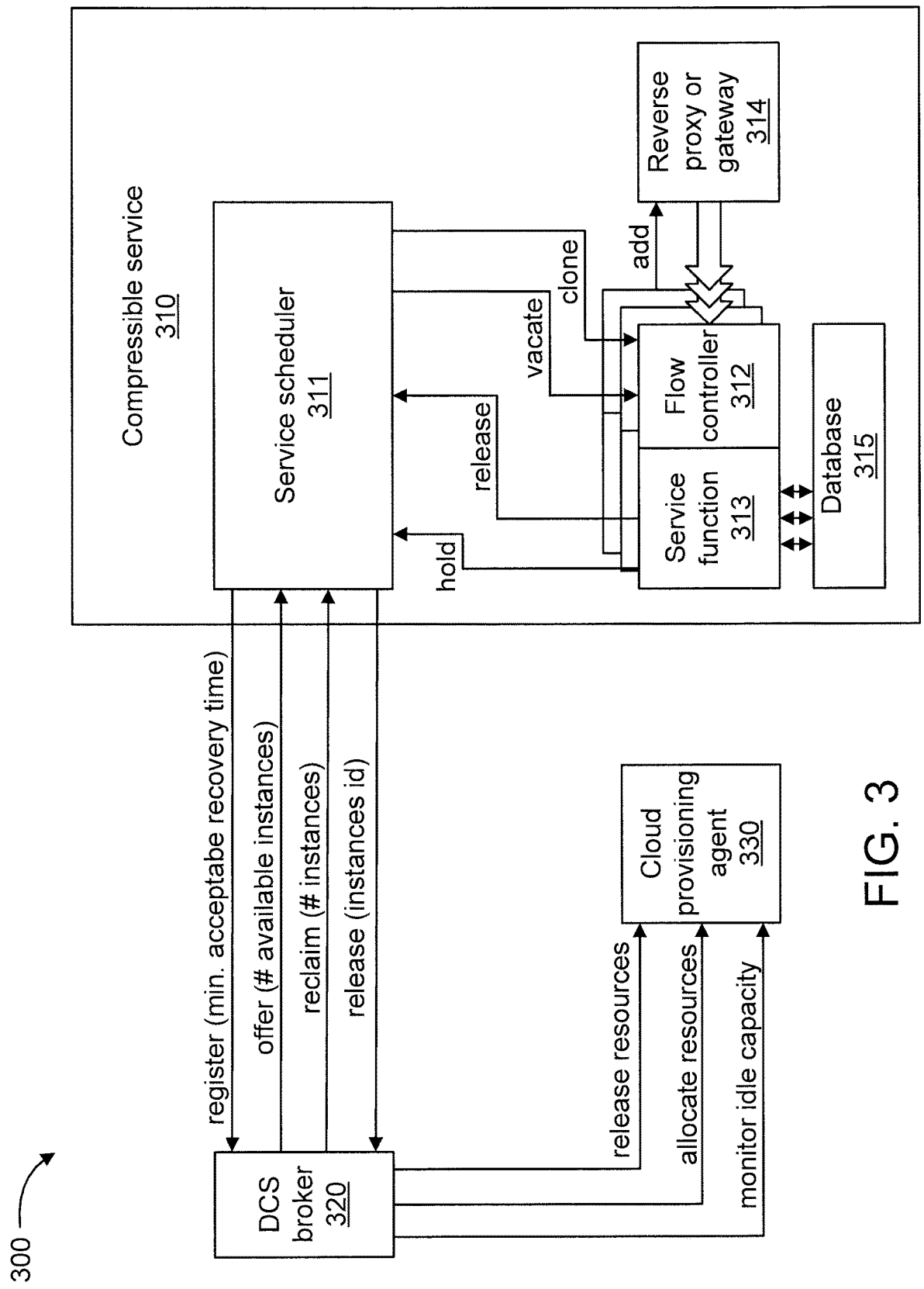
FIG. 3 shows an exemplary system for synchronized release of resources used in deferential cloud services, in accordance with an embodiment of the present invention.

Also, it is to be appreciated that system 300 described below with respect to FIG. 3 is a system for implementing respective embodiments of the present invention. Part or all of processing system 100 may be implemented in one or more of the elements of system 300.

Figure 4:
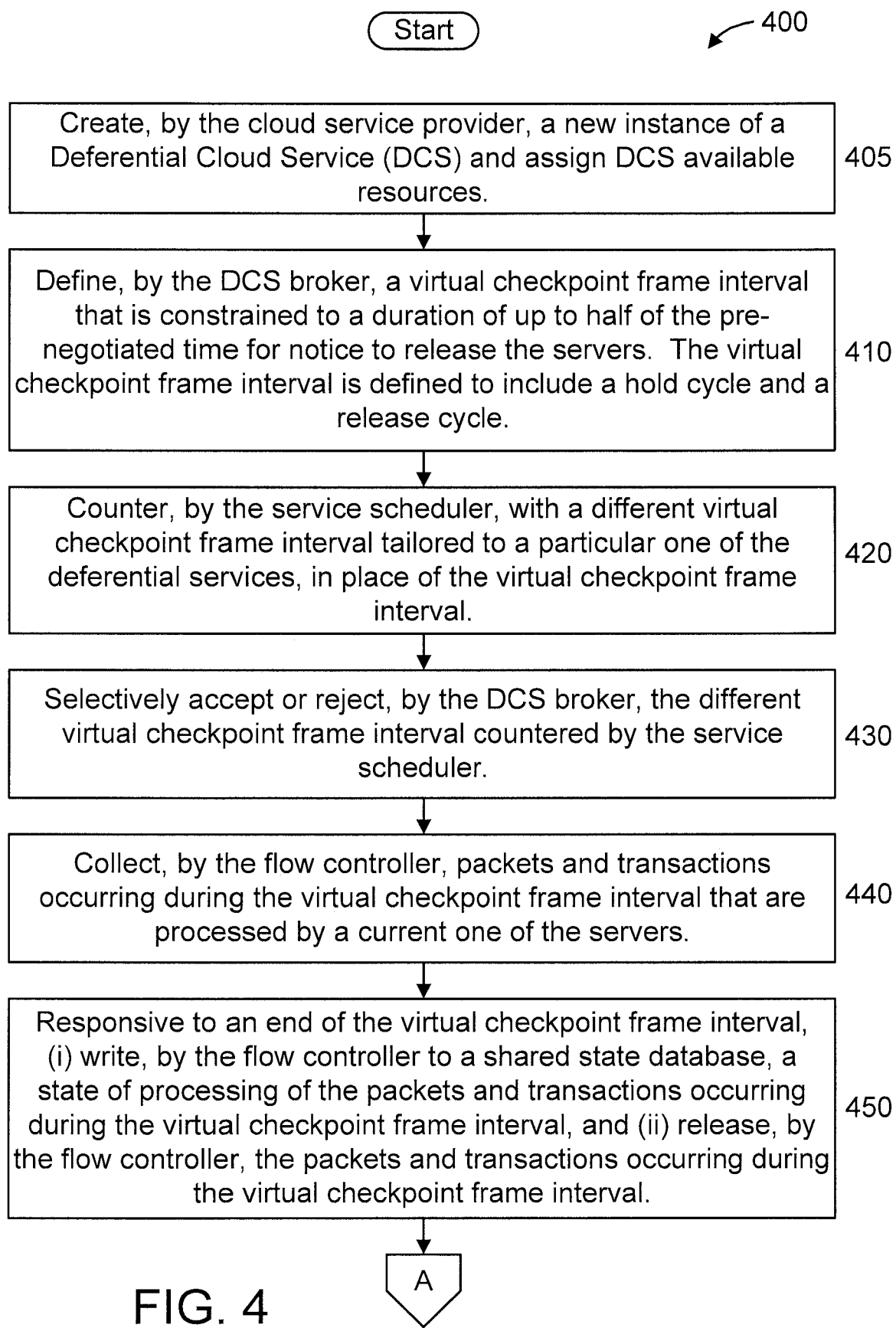
FIGS. 4-5 show an exemplary method for synchronized release of resources used in deferential cloud services, in accordance with an embodiment of the present invention.
Figure 5:
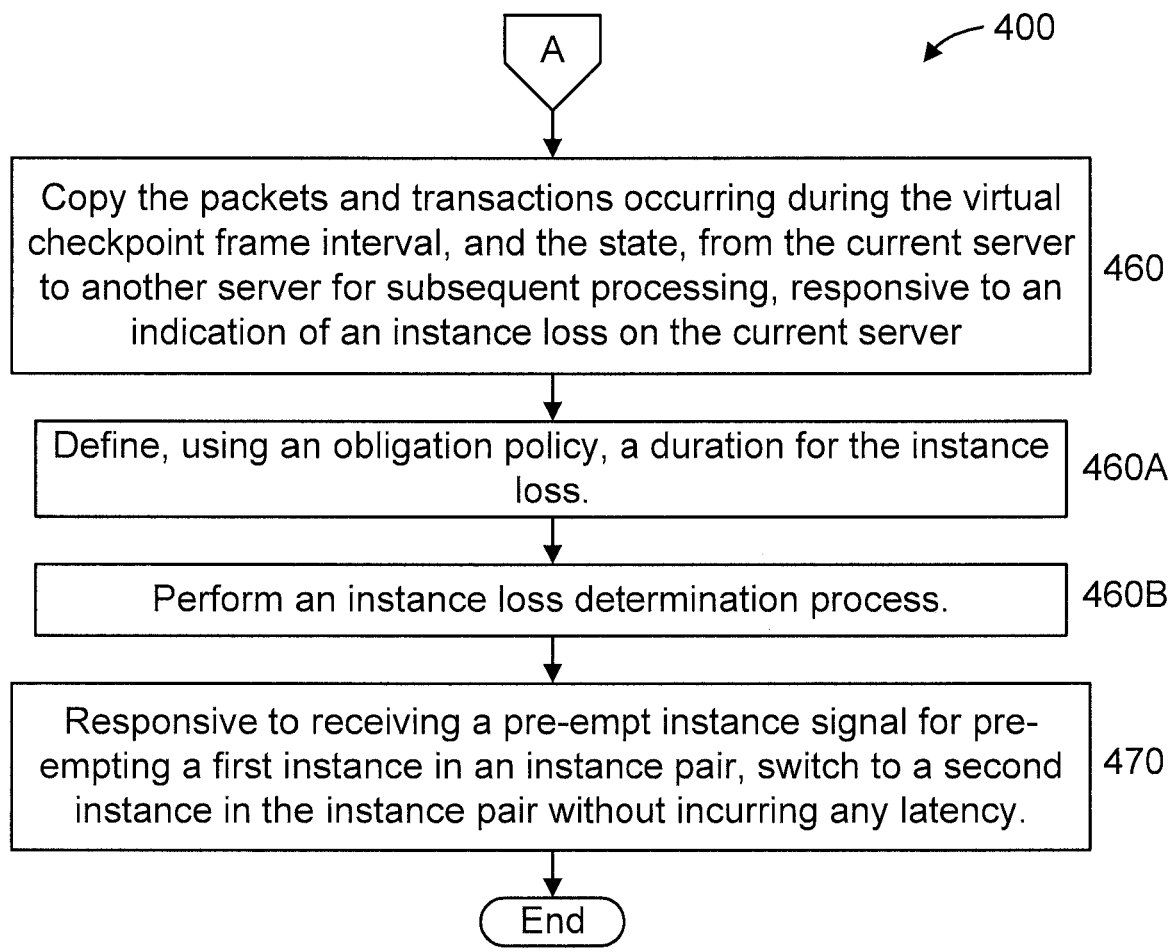

Further, it is to be appreciated that processing system 100 may perform at least part of the method described herein including, for example, at least part of method 400 of FIGS. 4-5. Similarly, part or all of system 200 may be used to perform at least part of method 400 of FIGS. 4-5.

FIG. 2 shows an exemplary environment 200 to which the present invention can be applied, in accordance with an embodiment of the present invention.

The environment 200 includes a cloud service provider 210 for providing various sets of deferential cloud services 210A-C to various customer sites 220A-C. The cloud service provider 210 can be considered to include a cloud operator provisioning system 210P.

The various sets of cloud services 210A-C includes deferential services as a special class of cloud based services that can scale down its resource utilization independent of the workload and without incurring any losses or degradation in performance. Associated with each deferential service is a registry of compressible services that are a special type of deferential services in that they use a pre-negotiated hold and release cycle for processing input network packets. For example, a compressible services registry 215A is associated with the deferential cloud service 210A, a compressible services registry 215B is associated with the deferential cloud service 210B, and a compressible services registry 215C is associated with the deferential cloud service 210C.

In the embodiment shown in FIG. 2, the elements thereof are interconnected by a wireless network 288. Of course, in other embodiments, other types of networks can also be used. Additionally, one or more elements in FIG. 2 may be implemented by a variety of devices, which include but are not limited to, Digital Signal Processing (DSP) circuits, programmable processors, Application Specific Integrated Circuits (ASICs), Field Programmable Gate Arrays (FPGAs), Complex Programmable Logic Devices (CPLDs), and so forth. These and other variations of the elements of system 200 are readily determined by one of ordinary skill in the art, given the teachings of the present invention provided herein, while maintaining the spirit of the present invention.

FIG. 3 shows an exemplary system 300 for synchronized release of resources used in deferential cloud services, in accordance with an embodiment of the present invention.

The system 300 includes a compressible service 310, a Deferential Cloud Service broker agent (or "DCS broker" in short) 320, and a cloud provisioning agent 330. In an embodiment, one or more of the compressible service 310, the DCS broker 320, and the cloud provisioning agent 330 are implemented by one or more hardware-based, processor and memory inclusive, devices and/or systems. That is, while also involving software, each of the elements 310, 320, and 330 can be implemented by hardware-based devices and/or systems that each at least include one or more processors and one or more memories.

The compressible service 310 includes service scheduler 311, a set of flow controllers (denoted and described singularly and in plural with respect to the figure reference numeral) 312, a set of service functions (denoted and described singularly and in plural with respect to the figure reference numeral) 313, a reverse proxy or gateway 314, and a database 315.

The DCS broker 320 is an integral part of the cloud operator provisioning system 210A and uses an opportunistic algorithm to declare and make available extra capacity that is recognized as an idle pool of resources and can be consumed and utilized by existing services running in the data center.

(2) The service scheduler 311 is an integral part of the deferential service provided by the cloud service provider 210 and uses a closed loop algorithm to define and implement a hold/release cycle that enforces the proper sequencing of events during the assignment and release of resources from and to the idle resource pool in agreement with the policy defined by the DCS broker 320. The service scheduler 311 synchronizes the graceful reduction in resource utilization under a constant workload and the return of the resources to the idle capacity pool.

(3) The flow controller 312 is an integral part of the deferential service provided by the cloud service provider 210 and defines and implements the clone/vacate protocol to enforce the proper sequencing of hand-off from a dying to a living instance of the same service. In particular, the clone protocol involves creating a new instance of the service function and registering such function with the Reverse Proxy while the vacate protocol reverses such action by de-registering a running instance of the service function and destroying such instance to free up resources.

(4) The DCS broker 320 proposes the minimum time window for the hold/release cycle upon which all borrowed capacity must be released upon notification by the DCS broker 320. The service scheduler 311 can accept or counter (using a counter offer) with a different time window that will best fit the functionality that the service provides. Such counter offer may be accepted or rejected by the DSC broker 320.

(5) The flow controller 312 retrieves and present the services with all queued packets during the hold phase and uses the release cycle to store any intermediate states in preparation for a vacate signal from the service scheduler 311.

The DCS broker 320 can send the following message/signal types to the cloud provisioning agent 330: (i) release resource; (ii) allocate resource; and iii) monitor idle capacity. The DCS broker 320 can send the following message/signal types to the scheduler 311: (i) offer (# of available instances); (ii) reclaim (# instances). The scheduler 311 can send the following message/signal types to the DCS broker 320: (i) register (minimum acceptable recovery time; and (ii) release (instances id). The set of service functions 313 can send the following message/signal types to the scheduler 311: (i) hold; and (ii) release. The scheduler 311 can send the following message/signal types to the set of flow controllers 312: (i) vacate; and (ii) clone. The set of flow controllers 312 can send the following message/signal types to the reverse proxy or gateway 314: (i) add.

FIGS. 4-5 show an exemplary method 400 for synchronized release of resources used in deferential cloud services, in accordance with an embodiment of the present invention.

At step 405, create, by the cloud service provider, a new instance of a Deferential Cloud Service (DCS) and assign DCS available resources.

At step 410, define, by the DCS broker, a virtual checkpoint frame interval that is constrained to a duration of up to half of the pre-negotiated time for notice to release the servers. The virtual checkpoint frame interval is defined to include a hold cycle and a release cycle.

At step 420, counter, by the service scheduler, with a different virtual checkpoint frame interval tailored to a particular one of the deferential services, in place of the virtual checkpoint frame interval. In an embodiment, the different virtual checkpoint frame interval is determined by adjusting an end-to-end duration of the (initial) virtual checkpoint frame interval based on available processing resources and a service-based tolerance for latency (where it is presumed that different ones of the deferential services will have different tolerances for latency, such that not all services are treated equally). In an embodiment, the different virtual checkpoint frame interval is determined by adjusting an end-to-end duration of the (initial) virtual checkpoint frame interval based service provider needs/capabilities and the cloud provider constraints.

At step 430, selectively accept or reject, by the DCS broker, the different virtual checkpoint frame interval countered by the service scheduler. For the sake of illustration, it is presumed that the counter was rejected and the (initial) virtual checkpoint frame interval is to be used.

At step 440, collect, by the flow controller, packets and transactions occurring during the virtual checkpoint frame interval that are processed by a current one of the servers (hereinafter "current server"). In an embodiment, the packets include one or more network packets, and/or one or more video frames, and/or one or more database records, and/or one or more text pages and/or so forth.

At step 450, responsive to an end of the virtual checkpoint frame interval, (i) write, by the flow controller to a shared state database, a state of processing of the packets and transactions occurring during the virtual checkpoint frame interval, and (ii) release, by the flow controller, the packets and transactions occurring during the virtual checkpoint frame interval. In an embodiment, the packets and transactions are released responsive to (i) the end of the virtual checkpoint frame interval, and (ii) a release notification from the scheduler. In an embodiment, the DCS broker uses an obligation policy to assign resources in pairs or multiples while constraining resource release (ii above) to a single resource at a time to allow for a gradual compression of the deferential service.

At step 460, copy the packets and transactions occurring during the virtual checkpoint frame interval, and the state, from the current server to another server for subsequent processing, responsive to an indication of an instance loss on the current server. In an embodiment, the indication of instance loss is an indication of imminent instance loss.

In an embodiment, step 460 includes steps 460A and 460B.

At step 460A, define, using an obligation policy, a duration for the instance loss.

At step 460B, perform an instance loss determination process.

At step 470, responsive to receiving a pre-empt instance signal for pre-empting a first instance in an instance pair, switch to a second instance in the instance pair without incurring any latency.

Thus, the present invention defines a high integrity deferential service as a special class of cloud based services that can gracefully scale down its resources utilization independent of the workload and without incurring any losses or degradation in performance. This is accomplished using a procedure for providing an advance indication that includes the following:

1. Define a virtual checkpoint frame interval, i.e. a time that is one half or one third of the notice-period that is given by the system that the server is about to go away.
2. Collect all packets/transactions that occur during the virtual checkpoint frame interval, and write the resulting state from the processing to the shared state database at the end of a checkpoint frame. Release packets and/or transactions at the end of the checkpoint frame time.
3. If a notification of loss comes up, then copy all packets in the frame to the other server and have them process the information.

By keeping all shared state writes to the end of the checkpoint frame interval, the overhead is significantly reduced. At the same time, by buffering packets for the checkpoint interval, and then copying them over on the notifications, the work is able to be move over to another server without disruption as needed.

Figure 6:
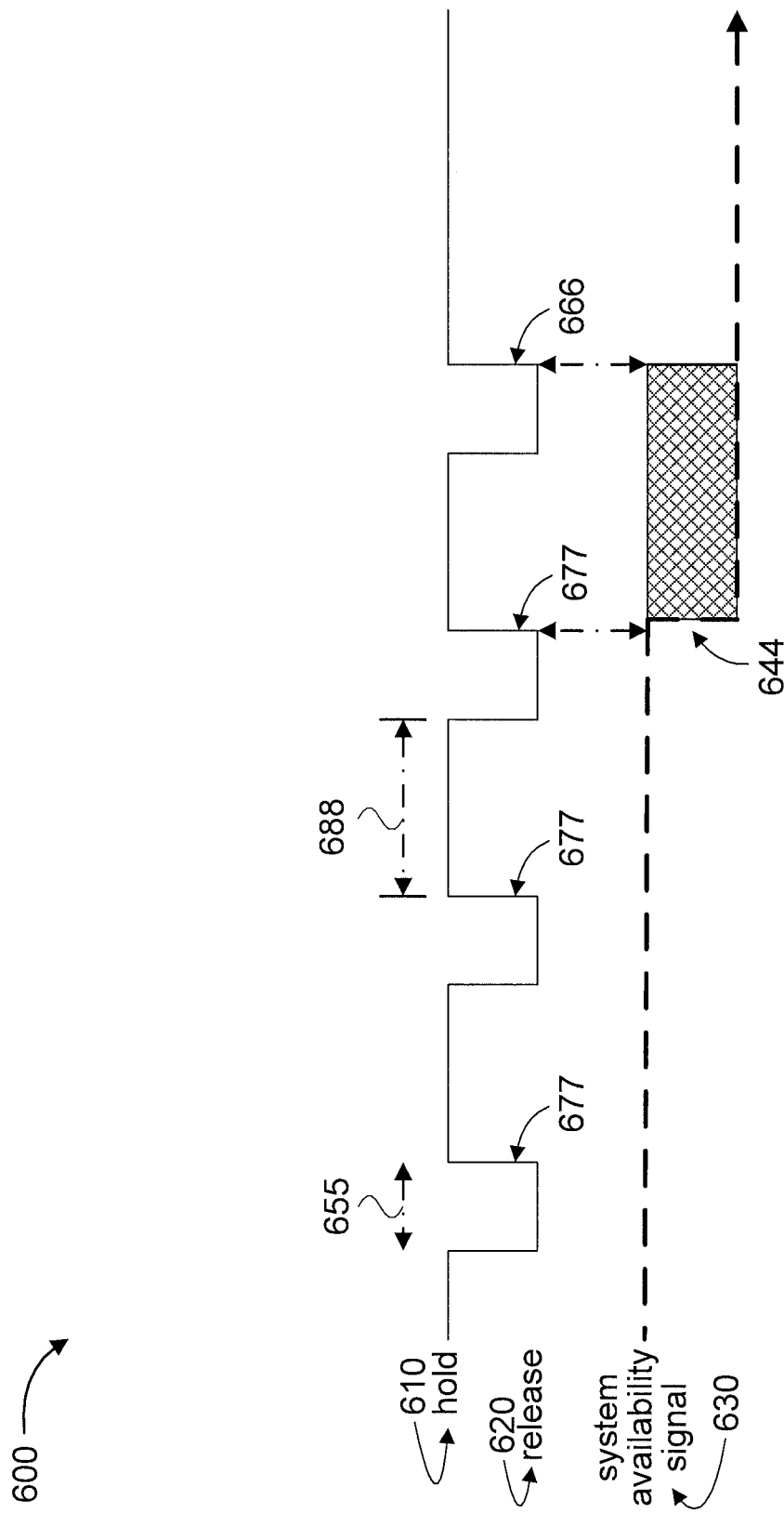
FIG. 6 shows an exemplary timing diagram for a hold cycle and a release cycle of a checkpoint frame interval, in accordance with an embodiment of the present invention.

The above procedure is represented in FIG. 6 with a two cycle virtual clock with a total equal duration to the checkpoint frame interval and includes a "hold" cycle and a "release" cycle. That is, FIG. 6 shows an exemplary timing diagram for a hold cycle 610 and a release cycle 620 of a checkpoint frame interval, in accordance with an embodiment of the present invention. The timing is for the cycles 610 and 620 is shown relative to a system availability signal 630. During the hold cycle 610, we retrieve and process all queued packets. During the release cycle, we check to see if we are about to lose the resource, and only then we write out the state 666 and any pertinent context. If there is no trigger detected during the release cycle, than this becomes a no-op 677. As seen, there is an induced latency 655. The time window can be adjusted 588 based on throughput and available resources. A release request 644 can be occur at any time during a cycle but is only processed on the "up" transition.

Thus, the present invention, unlike the prior art, addresses the cyclical nature of the deferential services and uses such cyclical nature to reduce unnecessary overhead. For example, a problem that the current art does not address occurs when the deferential service is interrupted in the middle of a cycle. In such a case, the deferential service needs to save all intermediate results or occur a loss of all associated data. Both options have negative implication on the quality of service.

For example, the deferential service provider may define a service cycle for a network gateway function that starts when an incoming packet arrives and ends when the associated outgoing packet is delivered. If according to the lease agreement, the gateway function is vacated before the outgoing packet is posted, then the incoming packet would need to be saved and reprocessed at a later time or dropped and retransmitted at a later time.

In accordance with the present invention, an approach is provided that allows the deferential service to complete all computation associated with the last cycle it started before it is vacated. This goes beyond the pre-negotiated time for notice to release and allows the deferential service provider to negotiate the time window required for vacating the service when the notice to release is received.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 7:
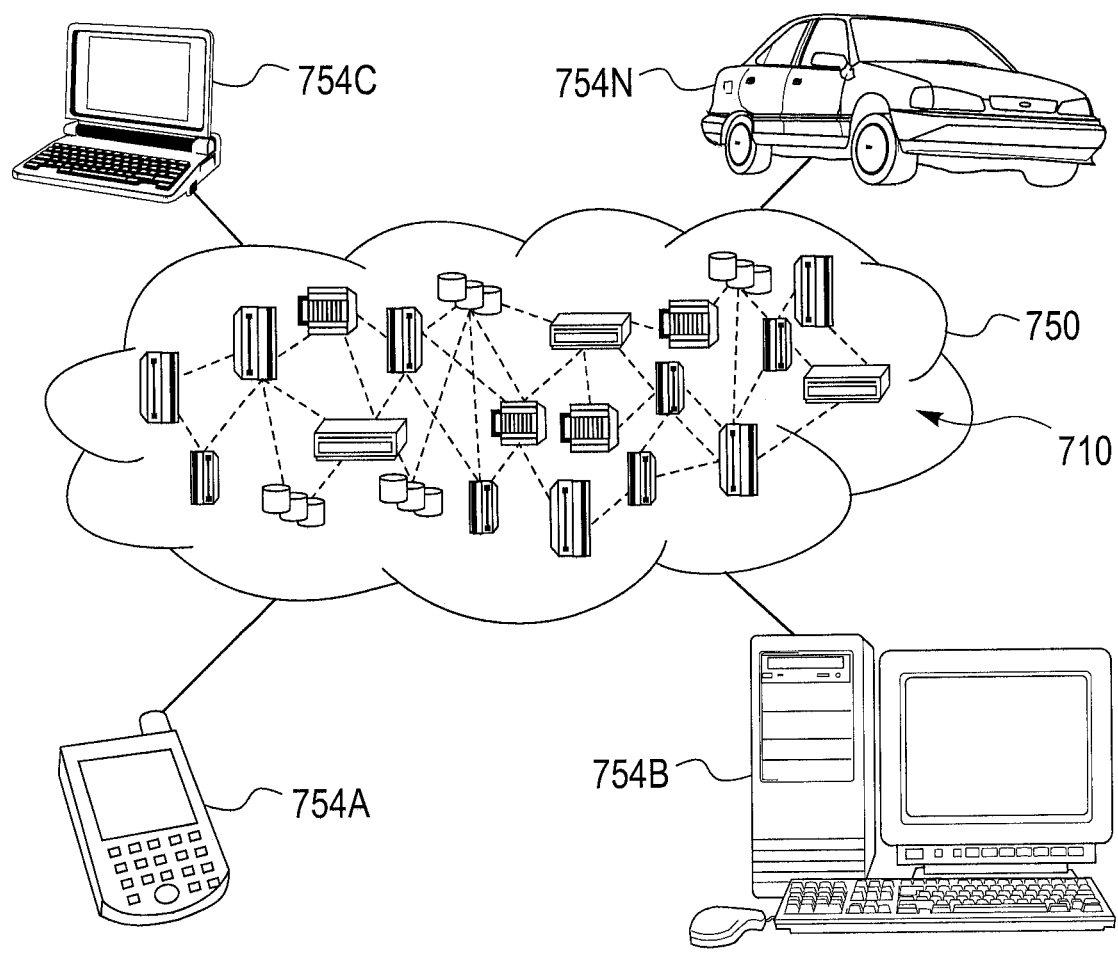
FIG. 7 shows an exemplary cloud computing environment, in accordance with an embodiment of the present principles.

Referring now to FIG. 7, illustrative cloud computing environment 750 is depicted. As shown, cloud computing environment 750 includes one or more cloud computing nodes 710 with which local computing devices used by cloud consumers, such as, for example, personal digital assistant (PDA) or cellular telephone 754A, desktop computer 754B, laptop computer 754C, and/or automobile computer system 754N may communicate. Nodes 710 may communicate with one another. They may be grouped (not shown) physically or virtually, in one or more networks, such as Private, Community, Public, or Hybrid clouds as described hereinabove, or a combination thereof. This allows cloud computing environment 750 to offer infrastructure, platforms and/or software as services for which a cloud consumer does not need to maintain resources on a local computing device. It is understood that the types of computing devices 754A-N shown in FIG. 7 are intended to be illustrative only and that computing nodes 710 and cloud computing environment 750 can communicate with any type of computerized device over any type of network and/or network addressable connection (e.g., using a web browser).

Figure 8:
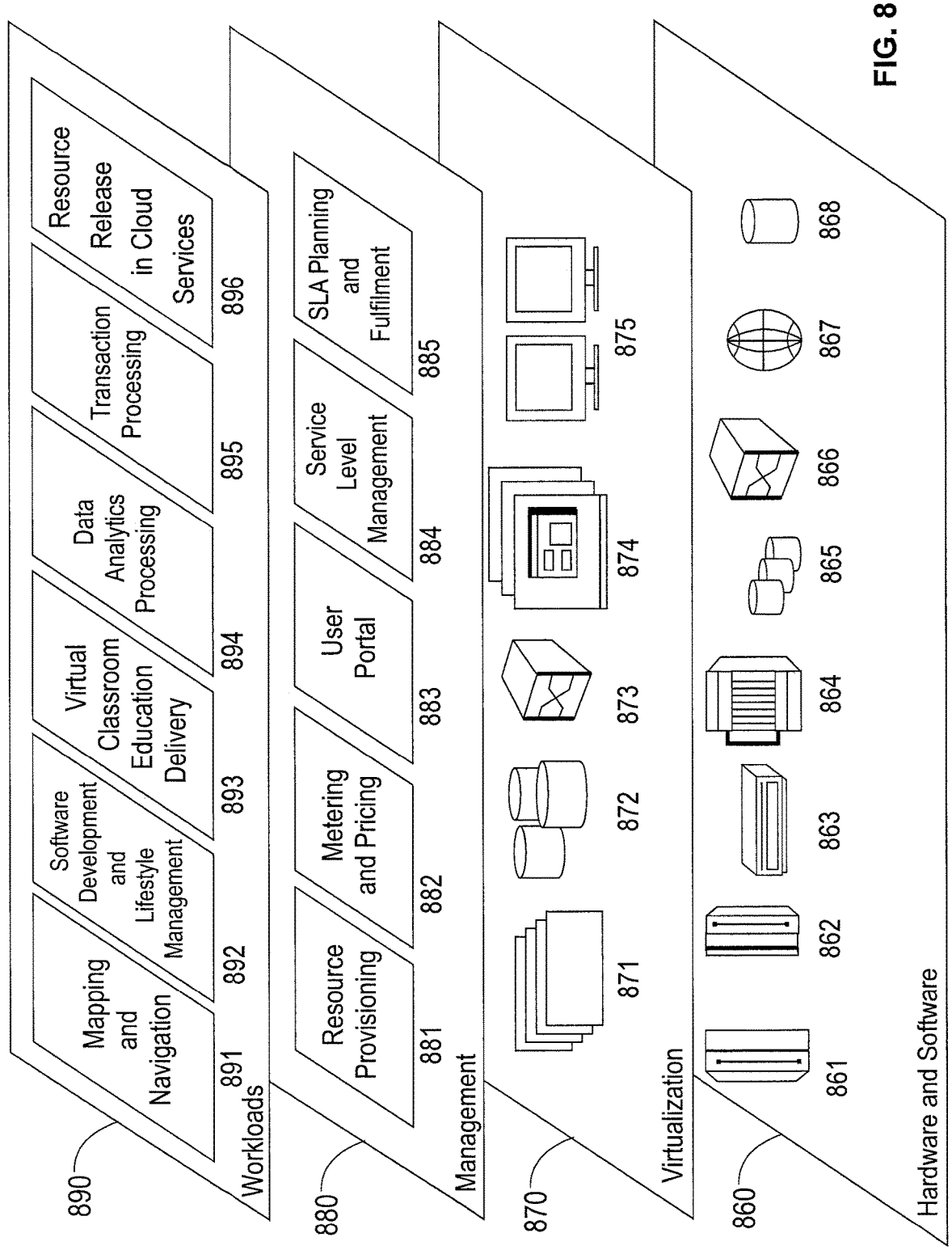
FIG. 8 shows an exemplary set of functional abstraction layers provided by the cloud computing environment shown in FIG. 7, in accordance with an embodiment of the present principles.

Referring now to FIG. 8, a set of functional abstraction layers provided by cloud computing environment 750 (FIG. 7) is shown. It should be understood in advance that the components, layers, and functions shown in FIG. 8 are intended to be illustrative only and embodiments of the invention are not limited thereto. As depicted, the following layers and corresponding functions are provided:

Hardware and software layer 860 includes hardware and software components. Examples of hardware components include: mainframes 861; RISC (Reduced Instruction Set Computer) architecture based servers 862; servers 863; blade servers 864; storage devices 865; and networks and networking components 866. In some embodiments, software components include network application server software 867 and database software 868.

Virtualization layer 870 provides an abstraction layer from which the following examples of virtual entities may be provided: virtual servers 871; virtual storage 872; virtual networks 873, including virtual private networks; virtual applications and operating systems 874; and virtual clients 875.

In one example, management layer 880 may provide the functions described below. Resource provisioning 881 provides dynamic procurement of computing resources and other resources that are utilized to perform tasks within the cloud computing environment. Metering and Pricing 882 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 883 provides access to the cloud computing environment for consumers and system administrators. Service level management 884 provides cloud computing resource allocation and management such that required service levels are met. Service Level Agreement (SLA) planning and fulfillment 885 provide pre-arrangement for, and procurement of, cloud computing resources for which a future requirement is anticipated in accordance with an SLA.

Workloads layer 890 provides examples of functionality for which the cloud computing environment may be utilized. Examples of workloads and functions which may be provided from this layer include: mapping and navigation 891; software development and lifecycle management 892; virtual classroom education delivery 893; data analytics processing 894; transaction processing 895; and synchronized resource release in cloud services 896.

The present invention may be a system, a method, and/or a computer program product at any possible technical detail level of integration. The computer program product may include a computer readable storage medium (or media)

having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

Having described preferred embodiments of a system and method (which are intended to be illustrative and not limiting), it is noted that modifications and variations can be made by persons skilled in the art in light of the above teachings. It is therefore to be understood that changes may be made in the particular embodiments disclosed which are within the scope of the invention as outlined by the appended claims. Having thus described aspects of the invention, with the details and particularity required by the patent laws, what is claimed and desired protected by Letters Patent is set forth in the appended claims.

The invention claimed is:

1. A computer program product for using a set of servers to provide deferential services that have a pre-negotiated time for notice to release the servers, the computer program product comprising a non-transitory computer readable storage medium having program instructions embodied therewith, the program instructions executable by a computer to cause the computer to perform a method comprising:
    defining, by a deferential cloud service broker, a virtual checkpoint frame interval that is constrained to a duration of up to half of the pre-negotiated time for notice to release the servers;
    responsive to an end of the virtual checkpoint frame interval,
        (i) writing, by a flow controller to a shared state database, a state of processing of packets and transactions occurring during the virtual checkpoint frame interval that are processed by a current one of the servers, and
        (ii) releasing, by the flow controller, the packets and transactions occurring during the virtual checkpoint frame interval; and
    copying, by the flow controller, the packets and transactions occurring during the virtual checkpoint frame interval, and the state, from the current one of the servers to another one of the servers for subsequent processing, responsive to an indication of an instance loss on the current one of the servers.

2. The computer program product of claim 1, wherein the flow controller releases the packets and transactions responsive to (i) the end of the virtual checkpoint frame interval, and (ii) a release notification from a service scheduler.

3. The computer program product of claim 1, further comprising, defining, by the deferential cloud service broker using an obligation policy, a duration for the instance loss.

4. The computer program product of claim 3, further comprising countering, by a service scheduler to the deferential cloud service broker, with a different virtual checkpoint frame interval tailored to a particular one of the deferential services, in place of the virtual checkpoint frame interval.

5. The computer program product of claim 4, further comprising selectively accepting or rejecting, by the deferential cloud service broker, the different virtual checkpoint frame interval countered by the service scheduler.

6. The computer program product of claim 1, wherein the deferential cloud service broker uses an obligation policy to assign resources in pairs or multiples while constraining resource release to a single resource at a time to allow for a gradual compression of the deferential services.

7. The computer program product of claim 6, wherein the deferential cloud service broker uses a pair-wise instance assignment such that responsive to receiving a pre-empt instance signal for pre-empting a first instance in an instance pair, the method further comprises switching to a second instance in the instance pair without incurring any latency.

8. A system for using a set of servers to provide deferential services that have a pre-negotiated time for notice to release the servers, the system comprising:
    a deferential cloud service broker for defining a virtual checkpoint frame interval that is constrained to a duration of up to half of the pre-negotiated time for notice to release the servers;
    a flow controller for, responsive to an end of the virtual checkpoint frame interval,
        (i) writing, to a shared state database, a state of processing of packets and transactions occurring during the virtual checkpoint frame interval that are processed by a current one of the servers, and
        (ii) releasing the packets and transactions occurring during the virtual checkpoint frame interval,
    wherein the flow controller copies the packets and transactions occurring during the virtual checkpoint frame interval, and the state, from the current one of the servers to another one of the servers for subsequent processing, responsive to an indication of an instance loss on the current one of the servers.

* * * * *